United States Patent [19]

Ratti

[11] 4,155,460

[45] May 22, 1979

[54] TOOL HOUSING AND DISPLAYING SUPPORT, IN PARTICULAR FOR NUMERICALLY CONTROLLED MACHINES

[75] Inventor: Mario Ratti, Bresso, Italy

[73] Assignee: S.U.S.T.A. S.p.A., Milan, Italy

[21] Appl. No.: 866,400

[22] Filed: Dec. 30, 1977

[30] Foreign Application Priority Data

Mar. 4, 1977 [IT] Italy .............................. 20827/77[U]

[51] Int. Cl.² .............................. A47F 7/00; B62B 1/00
[52] U.S. Cl. .................................. 211/60 T; 280/79.3
[58] Field of Search .................. 211/1.5, 60 T, 69, 65, 211/126; 248/314; 279/1 R; 269/16; 280/79.2, 79.3, 47.11, 47.37, 47.35

[56] References Cited

U.S. PATENT DOCUMENTS

| 2,371,433 | 3/1945 | Davis | 211/60 T |
|---|---|---|---|
| 2,966,991 | 1/1961 | Duffner | 211/60 R |
| 3,179,255 | 4/1965 | De'Caccia | 211/60 T |
| 3,604,565 | 9/1971 | Freeman | 211/60 T |
| 3,759,538 | 9/1973 | Fabiano | 211/60 T |

*Primary Examiner*—Thomas J. Holko
*Attorney, Agent, or Firm*—Wenderoth, Lind & Ponack

[57] ABSTRACT

A support for housing and displaying tools adapted to be used on numerically controlled machines includes a plurality of bushings, each carrying one or more tool housing seats. The bushings are removably and interchangeably mounted in a rectangular metallic frame so that the support may carry a series of different or equal bushings according to the type and sizes of tools to be housed therein.

11 Claims, 10 Drawing Figures

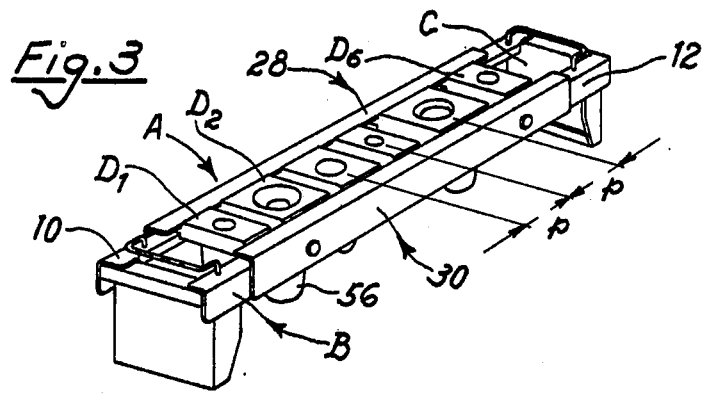
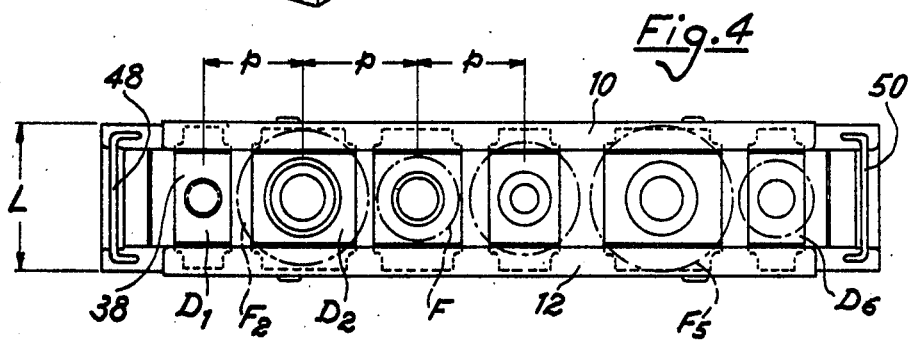
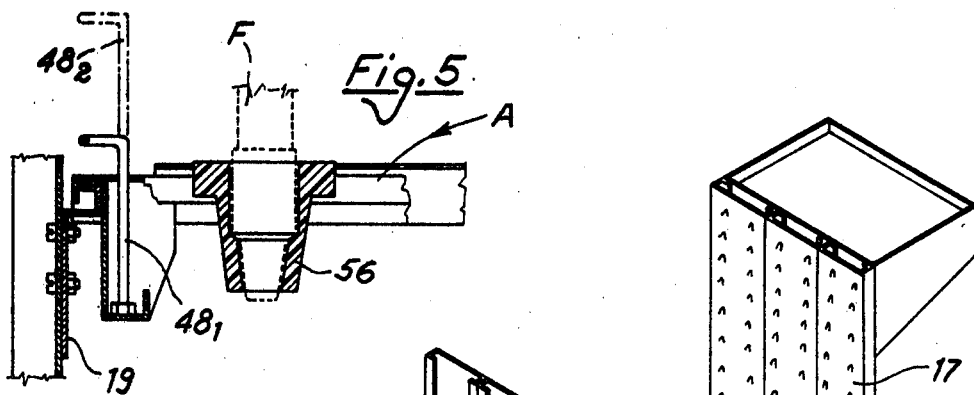
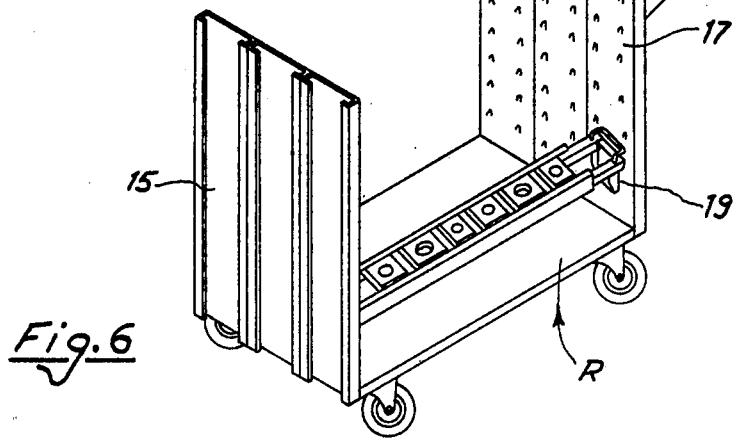

TOOL HOUSING AND DISPLAYING SUPPORT, IN PARTICULAR FOR NUMERICALLY CONTROLLED MACHINES

BACKGROUND OF THE INVENTION

1. Field of the Invention

This invention relates to a tool housing and displaying support, in particular for tools adapted to be used on numerically controlled machines.

2. Description of the Prior Art

A preceding patent application (U.S. Pat. No. 4,117,937) describes an assembly comprising in combination a plurality of supports, wherein tools in particular for numerically controlled machines are housed, and a dolly wherein the supports are detachably mounted. Each support is formed by a suitably shaped longitudinal plate having a series of previously sized seats wherein preferably tapered bushings are fixed to obtain a bushing series adapted to house tools, for instance spindles or the like.

The above described dolly-support assembly operates in a satisfactory manner, but the support structure involves some limits as it is not possible to use the same support for housing differently sized tools. In fact the known support structure was previously designed to receive particular bushings having equal sizes and placed at the same distance from one another.

Accordingly, it was necessary to have numerous supports in order to house differently sized tools, as well as a support store, wherefrom the supports were taken and mounted on the dolly, with the related tools for numerically controlled machines.

SUMMARY OF THE INVENTION

The main object of this invention is to overcome the above drawbacks.

Accordingly, this invention comprises a tool housing displaying and supplying support, in particular for tools adapted to be used in numerically controlled machines. The support comprises means for mounting the support on a dolly together with further equal or similar supports, preferably in such a manner that the tool plane can be suitably angularly positioned, characterized in that it shows a long frame metallic structure formed by a pair of parallel longitudinal members and a pair of end cross members defining therebetween a recess adapted to receive a plurality of interchangeable tool housing bushings or the like, each of the bushings having means for exactly positioning the same within the frame, so that the above stated recess may be filled with a given number of bushings, which can be differently sized in order to house differently sized tools.

Each of said longitudinal members advantageously has a plurality of suitably spaced holes, while each bushing comprises an upper quadrilateral frame connected with a body having the tool housing seat. The upper frame sides designed to cooperate with the longitudinal members have pins or like means adapted to penetrate within the longitudinal member holes. The bushings are then fastened into the recess with the cooperation of blocking means that may be fastened to the longitudinal members. The bushing frame size in a direction parallel to the cross members is defined by the cross member size, while the bushing frame size in a direction parallel to the longitudinal members may vary along with the pitch between the adjacent bushings.

BRIEF DESCRIPTION OF THE DRAWINGS

FIG. 3 is a perspective view of the support wherein a plurality of different bushings, namely six bushings are housed.

FIG. 4 is a plan view of the support of FIG. 3.

FIG. 5 is a partial end view of a support when mounted on a dolly.

FIG. 6 is a perspective view of a dolly carrying a support.

DETAILED DESCRIPTION OF THE INVENTION

Figure 1:
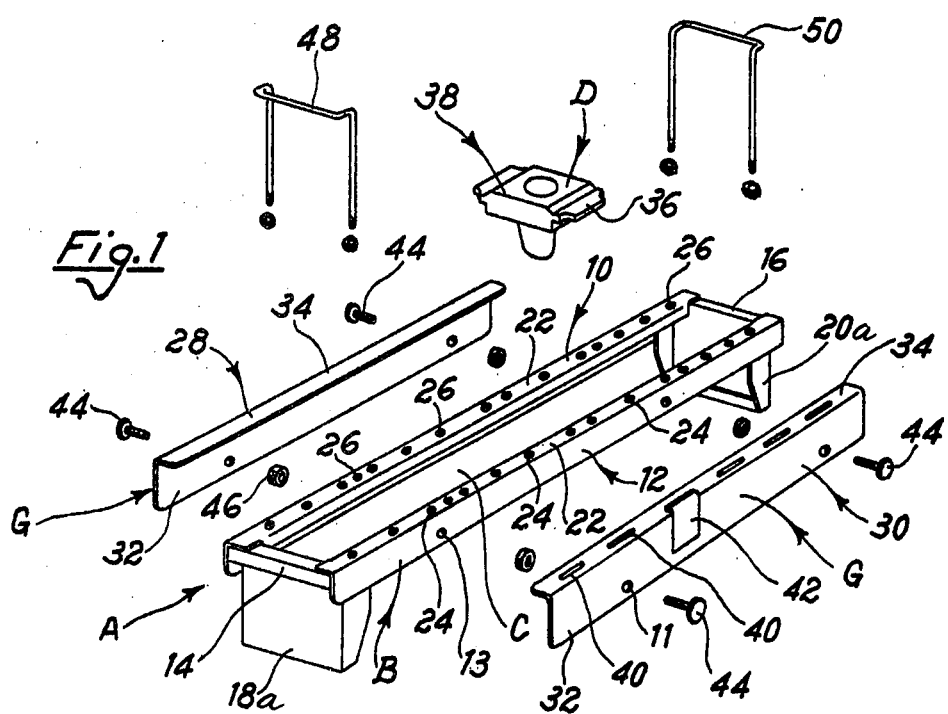
FIG. 1 is an exploded perspective view of a support according to this invention.
Figure 2:
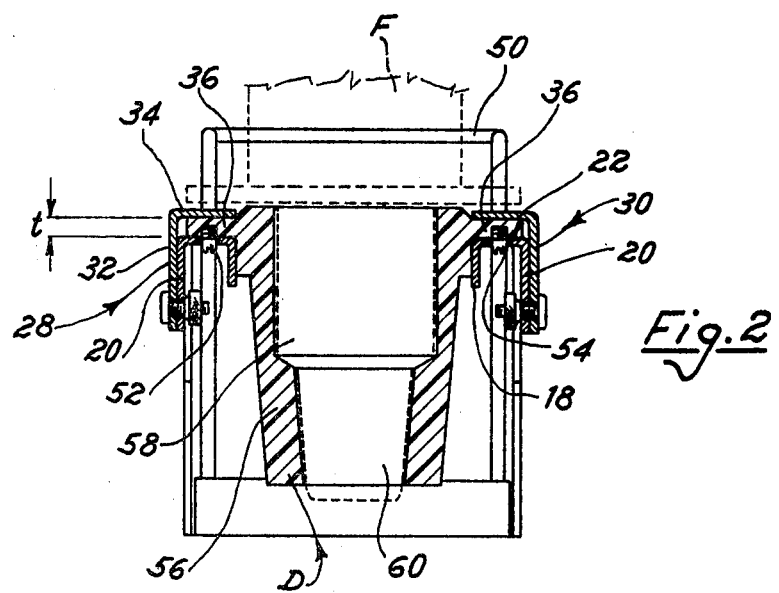
FIG. 2 is a cross section, on an enlarged scale, of the above support with a plastic bushing housed therein.

Referring now to the drawings and firstly to FIGS. 1 and 3, the tool housing and displaying support A according to this invention includes a characteristic metallic structure formed by a long parallelepipedon-shaped frame B defined by two parallel longitudinal member 10 and 12 and two end cross members 14 and 16 which are welded or soldered to the longitudinal members and are so shaped to include bearing feet 18a and 20a to sustain the support on a horizontal plane. The connection between the above stated longitudinal and cross members defines a rectangular recess C, wherein a plurality of bushings D for housing tools F, in particular tools for numerically controlled machines, can be seated.

Each longitudinal member 10 and 12 has overturned U-shaped cross-section with asymmetric legs formed by two vertical and parallel walls 18 and 20 and a horizontal wall 22. Horizontal walls 22 have a plurality of holes said horizontal wall 22 shows a plurality of holes 24 and 26, with a variable pitch between the adjacent holes of each plurality 24 and 26, i.e. with different distances between such holes, while it is also possible to have a constant pitch and then the same distance between each hole and adjacent holes.

The support A further comprises fastening means G, for instance in the form of angle irons 28 and 30 each having a vertical flange 32 and a horizontal flange 34, such angle irons being fastened to the longitudinal members 10 and 12 after the bushings D are seated within recess C, in such a manner that flanges 32 are fastened to walls 20 and flanges 34, extend parallel to walls 22 and are spaced therefrom by an amount t substantially equal to the thickness of a tongue 36 appertaining to an upper frame 38 of bushings D. The angle irons 28 and 30 may have holes 40 through the flanges 34 in order to retain hooks of lables carrying a tool identifying number. Such angle irons are fastened by a joint or by screws 44 which penetrate through holes provided in the angle irons and walls 20 and match with knurled nuts 46. The support further comprises two handles 48 and 50 which are slidably mounted within opposite ends of frame B and which can be moved between a concealed position $48_1$ and a lifted position $48_2$ as shown in FIG. 5.

As previously stated, the support A, due to the structure thereof and in particular to the presence of recess C, may retain a plurality of differently sized and suitably spaced bushings D, according to the size of tools F to be fastened by the bushings.

To this end, each bushing D has an upper quadrilateral frame 38 having opposite tongues 36, each of which has a lower pin 52 and 54 adapted to be inserted in the holes 24 and 26 of the horizontal walls 22 of longitudinal members 10 and 12.

Integral with upper frame 38 is a cone-shaped tool housing body 56, having two inner seats 58 and 60 with a reduced and respectively a greater taper ratio, so that the bushing D may alternately house tools with different shaped stems.

As shown in FIGS. 3 and 4, the support A holds a plurality of bushings $D_1$–$D_6$, all of which are different and adapted to house different tools.

Actually, when the type of tools to be housed within support A, are determined suitable bushings D, for instance bushings $D_1$–$D_6$ for six tools F, are chosen. These bushings in the illustrated case have different sizes, except the width of each bushing frame 38, which is determined by the support width, i.e. the distance between the longitudinal members 10 and 12. The bushings are mounted on the support by inserting their housing bodies 56 within recess C, while the bushing tongues 36 rest on the longitudinal member walls 22 and are exactly positioned by inserting the tongue pins 52 and 54 into longitudinal member holes 26 and 24, which are chosen as a function of the variable pitch P between the different bushings, which are in turn chosen according to the type of tools F to be housed. When the bushings $D_1$–$D_6$ are placed in such a manner that the pins 52 and 54 of each bushing are inserted into the corresponding longitudinal member holes, the bushing fastening means are set. The angle iron 28 is applied to the external wall 20 of longitudinal member 10 and the angle iron flange 34 is superimposed over the bushing frame tongue 36 to fasten the same between flange 34 and the longitudinal member wall 22. When angle iron 28 is so positioned, the screws 44 are inserted through the holes 11 and 13 of flange 32 and wall 20 and fixed by means of the threaded nuts 46 so that angle iron 28 is fixed against the longitudinal member 10 and the internal surface of flange 32 attached to the external surface of the longitudinal member wall 20. After fastening of angle iron 28, the angle iron 30 is fixed in the same way so that the support A carries six preselected bushings which are fastened within recess C with the desired pitches.

Accordingly, the housing seats 58 and 60 of each bushing D (each bushing may have two or more seats which may have a conical or cylindrical shape) can receive a related tool F, which will have a size to allow for the precise housing thereof within the seat.

It is then possible to house tools of different sizes and, as shown by tools $F_2$ and $F_5$, having heads of large diameters, when such tools are suitably spaced within adjacent bushings.

Actually due to the support structure bushing interchangeability is obtained and the same unit may be composed, according to the support sizes, of bushings of any type and of any number of bushings for each support. The bushings may also alternately support two or three tools, according to the structure and number of seats 58–60. The above support adaptability is not achieved by previously known supports, as this latter has a well defined number of equal and not interchangeable bushings which can house only well defined tools.

With the support according to this invention the user can vary the contents of the same and choose, according to the selected pitch, the bushings and tools to be fixed and housed.

FIGS. 7 to 10 show an alternative embodiment to detachably fasten the angle irons 28 and 30 to the longitudinal members 10 and 12, instead of screws 44 and nuts 46. According to this embodiment, the vertical wall of the longitudinal members, such as the shown member 12, has a through bore 70 and a latch plate 72 slidingly mounted on the inner side of such wall, plate 72 having therein a key-shaped bore 74. The plate 72 slides, by means of a guide groove 76, on a fixed pin 78 integral with the vertical wall of longitudinal member 12 and carrying one end of a spring 80 whose other end is attached to the plate 72 so to pull the same toward an end position wherein the bore 70 corresponds to the narrower portion of the key-shaped bore 74.

Figure 7:
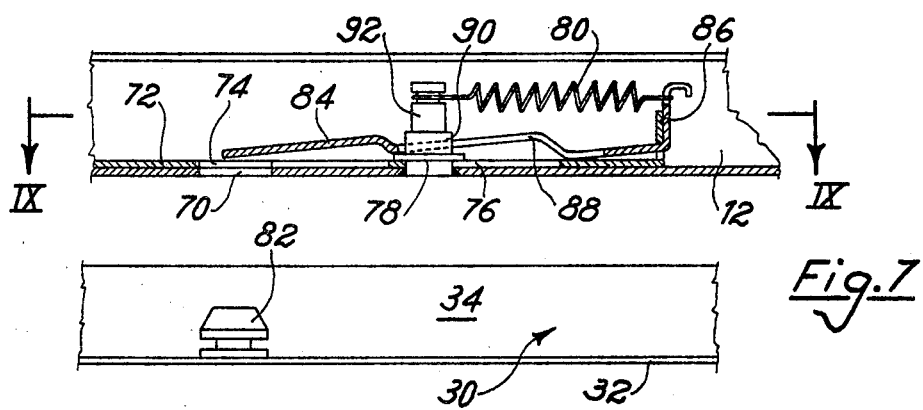
FIG. 7 is a cross-section of the support, along a vertical plane parallel to the longitudinal members, and showing an alternative embodiment of the bushing fastening means, in the position thereof before the blocking of the bushings.

The angle iron 28 (and 30) has, on its flange 32, a mushroom-shaped pin 82 which is so sized to be inserted through the bore 70 and the larger portion of key-shaped bore 74. When the pin 82 has been inserted, the spring 80 pulls the plate 72 toward the left as shown in figures so that the narrow portion of bore 74 is put in correspondence with the shank of mushroom-shaped pin 82 and holds the same and the angle iron 28 in the desired operating position. Two pins 82, together with related bores 70 and 74 and one or more plates 72, are sufficient to allow for a good holding of angle irons 28 or 30. As the spring 80 always pulls the plate 72 toward the left end position as shown in the drawings, it is necessary to manually shift the plate 72 until the larger portion of bore 74 is aligned with the bore 70 whenever the pin 82 must be inserted or disconnected. In order to effect the above manual operation only when the pin is to be disconnected, a second plate 84 is hingedly connected with plate 72, and is urged by the spring 80 to oscillate around its supporting zone 86 toward the plate 72. Second plate 84 also has a key-shaped bore 88 having a larger portion adapted to be inserted over an enlarged portion 90 of pin 78, as well as a narrower and lengthened portion adapted to bear against enlarged portion 90 of pin 78 and to slide on a reduced portion 92 of the pin 78. When the plate 72 is shifted by hand toward the right as shown in the drawings, in order to free the pin 82 and with straining of spring 80, the larger portion of bore 88 is inserted over the zone 90 of pin 78 and holds the device in the position as shown in FIG. 7.

Figure 8:
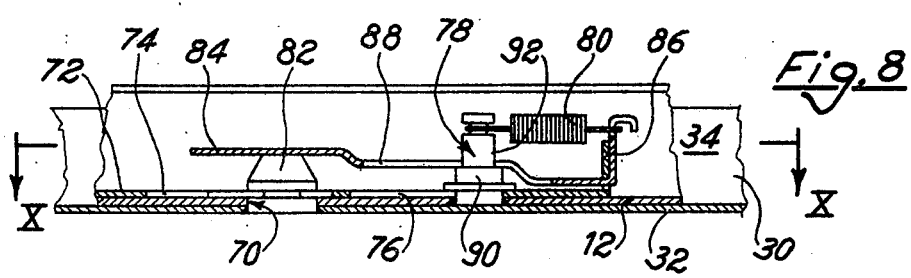
FIG. 8 is a cross-section corresponding to that of FIG. 7, with the fastening means in their blocking or hooking position.
Figure 9:
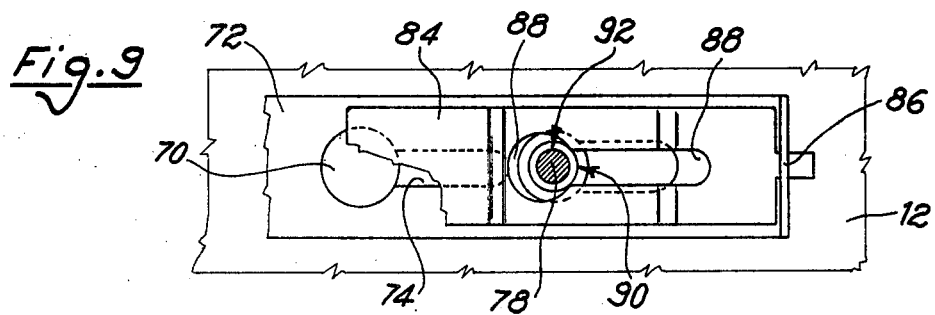
FIGS. 9 and 10 are partial cross-sections along the planes IX—IX and X—X respectively, of FIGS. 7 and 8.
Figure 10:
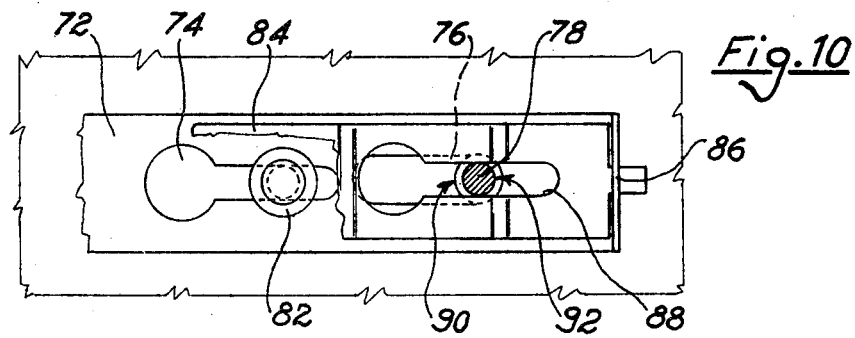

In this position the plate 84 has a free end aligned with bore 70 and the larger portion of bore 74, which are aligned. When the pin 82 is inserted, it moves plate 84 away from plate 72 until the opening 88 of plate 84 overcomes the enlarged portion 90 of pin 78 and allows a motion toward the left of the whole device, under the action of spring 80, until reaching a locking position as shown in FIGS. 8 and 10.

The illustrated support may also carry special tools when insulating plates with suitable holes are munted between the longitudinal members thereof, such plates being of wood or other suitable material. As above stated, the angle irons 28 and 30 could carry labels or numbers to identify the different tools.

It is to be pointed out that the illustrated slidable and concealable handles, i.e. handles which can be lowered to a rest condition and raised to an operating condition, allow for a better space exploitation, as the support vertical dimensions are substantially reduced when the handles are concealed.

FIGS. 5 and 6 show the support A when mounted on a transport dolly R, of a type as described and claimed in the U.S. Pat. No. 4,117,937. Such dolly has vertical opposed walls 15 and 17 with suitable hooks adapted to hold brackets 19 which can be suitably positioned so that the support displaying surface be horizontal or slanted in a given direction, the dolly being adapted to carry numerous supports A.

I claim:

1. A support for housing and displaying tools, particularly tools for numerically controlled machines, said support being adapted to be mounted on a dolly together with other equal or similar supports, preferably in such a manner that the tool display plane can be suitably positioned, said support comprising:

an elongated frame structure formed by a pair of spaced parallel longitudinal members and a pair of end cross members attached to said longitudinal members to define within said frame structure a recess, said longitudinal members having therein longitudinally spaced holes;

a plurality of tool housing bushings adapted to be interchangeably positioned within said recess, each said bushing including an upper quadrilateral frame integral with a body having at least one tool housing seat, said bushing frames each having opposite sides having depending therefrom fixing means for cooperation with selected of said holes in said longitudinal members and for thereby fixing the positions of said bushing frames within said recess, the dimension of said bushing frames in directions parallel to said cross members being defined by the length of said cross members, and the dimensions of said bushing frames in a direction parallel to said longitudinal members and the spacings between adjacent said bushing frames being variable, whereby a desired plurality of differently sized and shaped said bushings may be selectively positioned within said recess; and locking means, adapted to be fixed to said longitudinal members, for locking said bushings within selected fixed positions thereof within said recess.

2. A support as claimed in claim 1, wherein said locking means comprise angle shaped members each having a vertical flange adapted to be attached to a respective longitudinal member, and a horizontal flange adapted to contact the upper surfaces of respective said sides of said bushing frames, and attaching means for attaching said vertical flanges to said respective longitudinal members.

3. A support as claimed in claim 2, wherein said attaching means comprises screws and nuts.

4. A support as claimed in claim 2, wherein said attaching means comprises holes extending through said longitudinal members, pins on said vertical flanges and adapted to extend through said holes in said longitudinal members, said pins having reduced diameter neck portions, and movable plates having key-hole shaped openings including large size portions adapted to receive said pins and small size portions adapted to receive said neck portions, said movable plates being movable between an unlocked position whereat said large size portions are aligned with said pins and a locked position whereat said small size portions receive said neck portions and lock said pins.

5. A support as claimed in claim 4, further comprising fixed guiding and retaining means for retaining said movable plates on said respective longitudinal members and for guiding the movement of said movable plates between said unlocked and locked positions thereof, and spring means for urging said movable plates toward said locked positions thereof.

6. A support as claimed in claim 5, further comprising a lever pivotally connected to each said movable plate, said lever having retaining means cooperable with said guiding and retaining means for retaining said movable plate in said unlocked position thereof, and said lever having a tongue positioned to be contacted by said pin upon insertion thereof through said large portion of said key-hole shaped opening to release said retaining means and allow said spring means to move said movable plate to said locked position thereof.

7. A support as claimed in claim 6, wherein said retaining means comprises a key-hole shaped opening in said lever and including a large sized portion adapted to receive said guiding and retaining means and a small sized portion adapted to slide along a reduced size portion of said guiding and retaining means.

8. A support as claimed in claim 1, wherein each said bushing body has therein plural said tool housing seats, whereby each said bushing can alternatively house plural different tools.

9. A support as claimed in claim 1, further comprising handles positioned at opposite ends of said recess, said handles being mounted in said frame structure to be movable between lifted positions extending from said frame structure and lowered positions substantially concealed within said frame structure.

10. A support as claimed in claim 1, wherein said fixing means comprise pins adapted to fit within said holes in said longitudinal members.

11. A support as claimed in claim 1, wherein said locking means include means for supporting labels displaying information relates to tools housed by respective of said bushings positioned within said recess.

* * * * *